US008533731B2

(12) United States Patent
Sakamoto

(10) Patent No.: US 8,533,731 B2
(45) Date of Patent: Sep. 10, 2013

(54) APPARATUS AND METHOD FOR DISTRUBUTING COMPLEX EVENTS BASED ON CORRELATIONS THEREBETWEEN

(75) Inventor: Yoshinori Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/193,701

(22) Filed: Jul. 29, 2011

(65) Prior Publication Data

US 2012/0084788 A1 Apr. 5, 2012

(30) Foreign Application Priority Data

Oct. 5, 2010 (JP) .................................. 2010-226086

(51) Int. Cl.
*G06F 9/46* (2006.01)
(52) U.S. Cl.
USPC ........................................................ 718/105
(58) Field of Classification Search
None
See application file for complete search history.

(56) References Cited

U.S. PATENT DOCUMENTS

2005/0125798 A1* 6/2005 Peterson ........................ 718/105
2010/0172479 A1   7/2010 Lynch et al.

FOREIGN PATENT DOCUMENTS

JP          2010-160788 A      7/2010

OTHER PUBLICATIONS

Chen et al, "Complex Event Processing using Simple Rule-based Event Correlation Engines for Business Performance Management", CEC/EEE, 2006, pp. 1-8.*
Nishizawa, Susumu "IT Architect, vol. 23, IDG Japan", 2009, pp. 128-132 (with English Translation).

* cited by examiner

*Primary Examiner* — Emerson Puente
*Assistant Examiner* — Gregory A Kessler
(74) *Attorney, Agent, or Firm* — Fujitsu Patent Center

(57) ABSTRACT

A server calculates correlations between complex event processing processes performed by virtual machines (VMs) so as to detect events from streams using condition expressions for identifying the events. The server obtains the load status of each of the VMs. The server then detects a VM having a processing load exceeding a predetermined level based on the load status thus obtained. When a VM having a processing load exceeding a predetermined level is detected, the server distributes the complex event processing processes to the respective VMs based on the calculated correlations between the complex event processing processes.

8 Claims, 16 Drawing Sheets

FIG.6

| RULE NAME | ELEMENT LIST | EVENT |
|---|---|---|
| RULE 1 | A→B→C | EVENT 1 |
| RULE 2 | A→B→D | EVENT 2 |
| ... | ... | ... |

FIG.7

| ITEM NUMBER | INTERMEDIATE DATA | CORRELATING RULE |
|---|---|---|
| 1 | A | RULE 1 |
| 2 | A→B | RULE 1/RULE 2 |
| ... | ... | ... |

FIG.8

| RULE NAME | ELEMENT LIST/ EVENT | DEGREE OF RULE CORRELATION | STRENGTH OF CORRELATION | RESOURCE LOADS | | |
|---|---|---|---|---|---|---|
| | | | | CPU UTILIZATION RATE | MEMORY UTILIZATION RATE | NETWORK UTILIZATION RATE |
| RULE 1 | A→B→C/EVENT 1 | <2(3)> | RULE 3→RULE 2 | 43% | 40% | 70% |
| RULE 2 | A→B→D/EVENT 2 | <1(2)> | RULE 1 | 60% | 50% | 40% |
| RULE 3 | E→F→C/EVENT 3 | <1(1)> | RULE 1 | 10% | 12% | 30% |
| RULE 4 | G→H→I/EVENT 4 | <0(0)> | — | 20% | 35% | 10% |

FIG.9

| RULE NAME | DISTRIBUTEE LIST | STREAM LOAD |
|---|---|---|
| RULE 1 | VM 1 | 40% |
| RULE 2 | VM 1 | 10% |
| RULE 3 | VM 2 | 30% |
| ... | ... | ... |

FIG.10

| VM NAME | RULE LIST | RESOURCE LOADS | | |
|---|---|---|---|---|
| | | CPU UTILIZATION RATE | MEMORY UTILIZATION RATE | NETWORK UTILIZATION RATE |
| VM 1 | RULE 1/RULE 2 | 30% | 31% | 80% |
| VM 2 | RULE 3/RULE 4 | 55% | 45% | 40% |

FIG.15

| ELEMENT NAME | DEGREE OF ELEMENT CORRELATION | DEGREE OF RULE CORRELATION | RESOURCE LOADS | | |
|---|---|---|---|---|---|
| | | | CPU UTILIZATION RATE | MEMORY UTILIZATION RATE | NETWORK UTILIZATION RATE |
| ELEMENT A | <2&1: (A→B)> | RULE 1/2 | 75% | 63% | 70% |
| | <1&1: (A→B)→C> | RULE 1 | 65% | 58% | 68% |
| | <1&1: (A→B)→D> | RULE 2 | 13% | 21% | 3% |
| ELEMENT B | <2&1: (A→B)> | RULE 1/2 | 10% | 5% | 5% |
| | <1&2: (A→B→C)> | RULE 1 | 55% | 40% | 19% |
| | <1&2: (A→B→D)> | RULE 2 | 60% | 50% | 40% |
| ELEMENT C | <1&1: A→(B→C)> | RULE 1 | 10% | 12% | 30% |
| | <1&1: E→(F→C)> | RULE 3 | 33% | 13% | 21% |
| ELEMENT D | <1&1: A→(B→D)> | RULE 2 | 20% | 35% | 10% |

FIG.16

| ELEMENT NAME | DISTRIBUTEE LIST | STREAM LOAD |
|---|---|---|
| ELEMENT A | VM 1 | 40% |
| ELEMENT B | VM 1 | 10% |
| ELEMENT C | VM 1 | 30% |
| ... | ... | ... |

| VM NAME | LIST | RESOURCE LOADS | | |
|---|---|---|---|---|
| | | CPU UTILIZATION RATE | MEMORY UTILIZATION RATE | NETWORK UTILIZATION RATE |
| VM 1 | RULE 1/RULE2/ RULE3/RULE 4 | 80% | 31% | 25% |

(b)

| VM NAME | LIST | RESOURCE LOADS | | |
|---|---|---|---|---|
| | | CPU UTILIZATION RATE | MEMORY UTILIZATION RATE | NETWORK UTILIZATION RATE |
| VM 1 | ELEMENT A, ELEMENT B | 35% | 15% | 23% |
| VM 2 | ELEMENTS C TO I | 25% | 22% | 32% |

APPARATUS AND METHOD FOR DISTRUBUTING COMPLEX EVENTS BASED ON CORRELATIONS THEREBETWEEN

CROSS-REFERENCE TO RELATED APPLICATION

This application is based upon and claims the benefit of priority of the prior Japanese Patent Application No. 2010-226086, filed on Oct. 5, 2010, the entire contents of which are incorporated herein by reference.

FIELD

The embodiments discussed herein are directed to a complex event distributing apparatus, a complex event distributing method, and a complex event distributing program.

BACKGROUND

Complex event processing (CEP), in which data generated in a system is monitored in real-time as a stream and a certain process is executed depending on the pattern of the data thus monitored, has been increasingly becoming popular in recent years. While CEP is sometimes referred to as event stream processing (ESP), ESP is herein included in CEP and collectively referred to as CEP.

As an example of CEP, a fluctuation of a stock price or a currency exchange rate is received as a stream, and transactions are executed corresponding to the pattern of the fluctuation. As another example, a temperature detected with a temperature sensor installed outdoor or indoor is received as a stream, and a sprinkler is caused to operate automatically corresponding to a temperature change.

In CEP, a received stream is matched against a condition expression, which is referred to as a query or a rule, to detect an event, and the event thus detected is executed. As an example, a server performing CEP stores therein a rule X for executing an event X when a phenomenon A, a phenomenon B, and a phenomenon C are detected consecutively, and a rule Y for executing an event Y when the phenomenon A, the phenomenon B, and a phenomenon D are received within a predetermined time period.

The server detects a phenomenon from a received stream and stores the phenomenon in a memory or the like as intermediate data. When the phenomenon A, the phenomenon B, and the phenomenon C are stored consecutively as intermediate data, the server executes the event X. When the phenomenon A, the phenomenon B, and the phenomenon D are stored as intermediate data within the predetermined time period, the server executes the event Y. A related-art example is described in *IT Architect*, Vol. 23, IDG Japan, 2009, pp. 128-132.

Conventional technologies sometimes cause deterioration of processing performance.

For example, in CEP to which a plurality of rules are applied, a plurality of servers or a plurality of virtual machines (VMs) are used to reduce the processing load and to detect events from streams in real-time. Memories or virtual memories are not shared between the servers or the VMs, and therefore, the intermediate data and the like may not be managed in a shared manner. Therefore, in conventional technologies, interrelated rules are assigned to the same serve or the same VM before starting CEP.

After starting the CEP, if an event detected by a certain rule occurs frequently, or if the stream load increases, the server assigned with such a rule needs to execute the event frequently, and the processing load of the server increases. As a result, the process of detecting an event from a stream is delayed in the server in which the event occurs frequently, and the server becomes incapable of processing the event in real-time. In other words, when a particular event is detected frequently, the processing performance of the entire CEP deteriorates.

SUMMARY

According to an aspect of an embodiment of the invention, a complex event distributing apparatus includes a calculating unit that calculates correlations between complex event processing processes executed on information processing apparatuses to detect events from a stream based on condition expressions each identifying an event; an obtaining unit that obtains a load status of each of the information processing apparatuses; a detecting unit that detects an information processing apparatus having a processing load exceeding a predetermined level based on the load status obtained by the obtaining unit; and a distributing unit that distributes the complex event processing processes to the information processing apparatuses based on the correlations between the complex event processing processes calculated by the calculating unit when the detecting unit detects an information processing apparatus having a processing load exceeding the predetermined level.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a schematic of an example of information stored in a rule management record for a VM;

FIG. 7 is a schematic of an example of intermediate data stored in a CEP status management record for the VM;

FIG. 8 is a schematic of an example of information stored in a rule correlation management record;

FIG. 9 is a schematic of an example of information stored in a distributee list/stream load management record;

FIG. 10 is a schematic of an example of information stored in a resource load management record;

FIG. 15 is a schematic of an example of information stored in a rule correlation management record according to the third embodiment;

FIG. 16 is a schematic of an example of information stored in a distributee list/stream load management record according to the third embodiment;

FIG. 17 is a schematic of an example of information stored in a resource load management record according to the third embodiment;

DESCRIPTION OF EMBODIMENTS

Preferred embodiments of the present invention will be explained with reference to accompanying drawings.

The embodiments disclosed herein are not intended to limit the scope of the present invention in any way.

[a] First Embodiment

Figure 1:
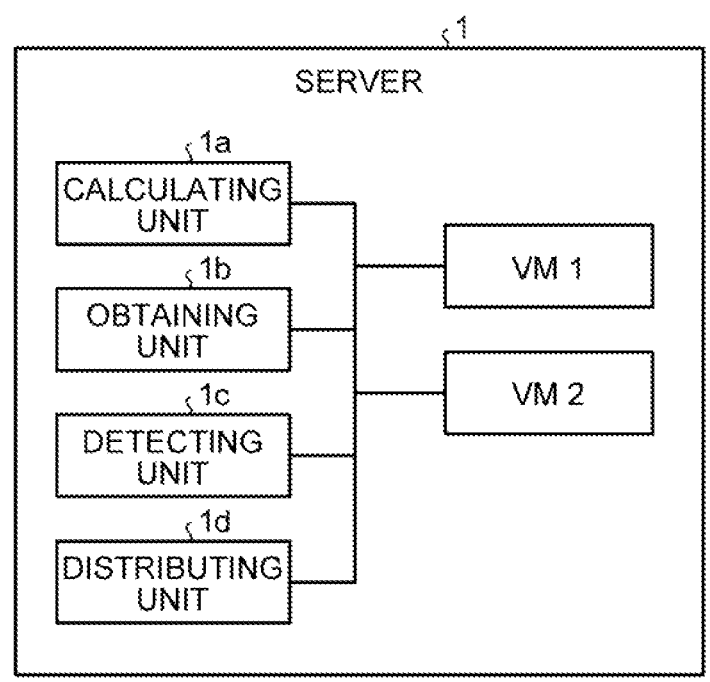
FIG. 1 is a block diagram of a configuration of a server according to a first embodiment of the present invention.

FIG. 1 is a block diagram of a configuration of a server according to a first embodiment of the present invention. A server 1 illustrated in FIG. 1 is a computer that executes complex event processing (CEP), monitoring data and the like generated in a system as a stream in real-time and executing a certain process corresponding to the pattern of the data thus generated. The number of servers, the number of virtual machines (VM), the number of rules, and the number of elements disclosed hereunder are provided only by way of example, and the invention is not limited thereto.

For example, the server 1 receives a fluctuation of a stock price or a currency exchange rate, data detected with various sensors, or HyperText Transfer Protocol (HTTP) traffics on a Web server as data streams. The server 1 then detects phenomena from the received data stream, identifies an event based on the combination of the detected phenomena, and executes the event thus identified. As an example, the server 1 automatically executes a transaction when the server 1 detects that the stock price has exceeded a predetermined price or the currency exchange rate becomes lower than a predetermined level consecutively from the data stream of the stock price or the currency exchange rate.

Figure 2:
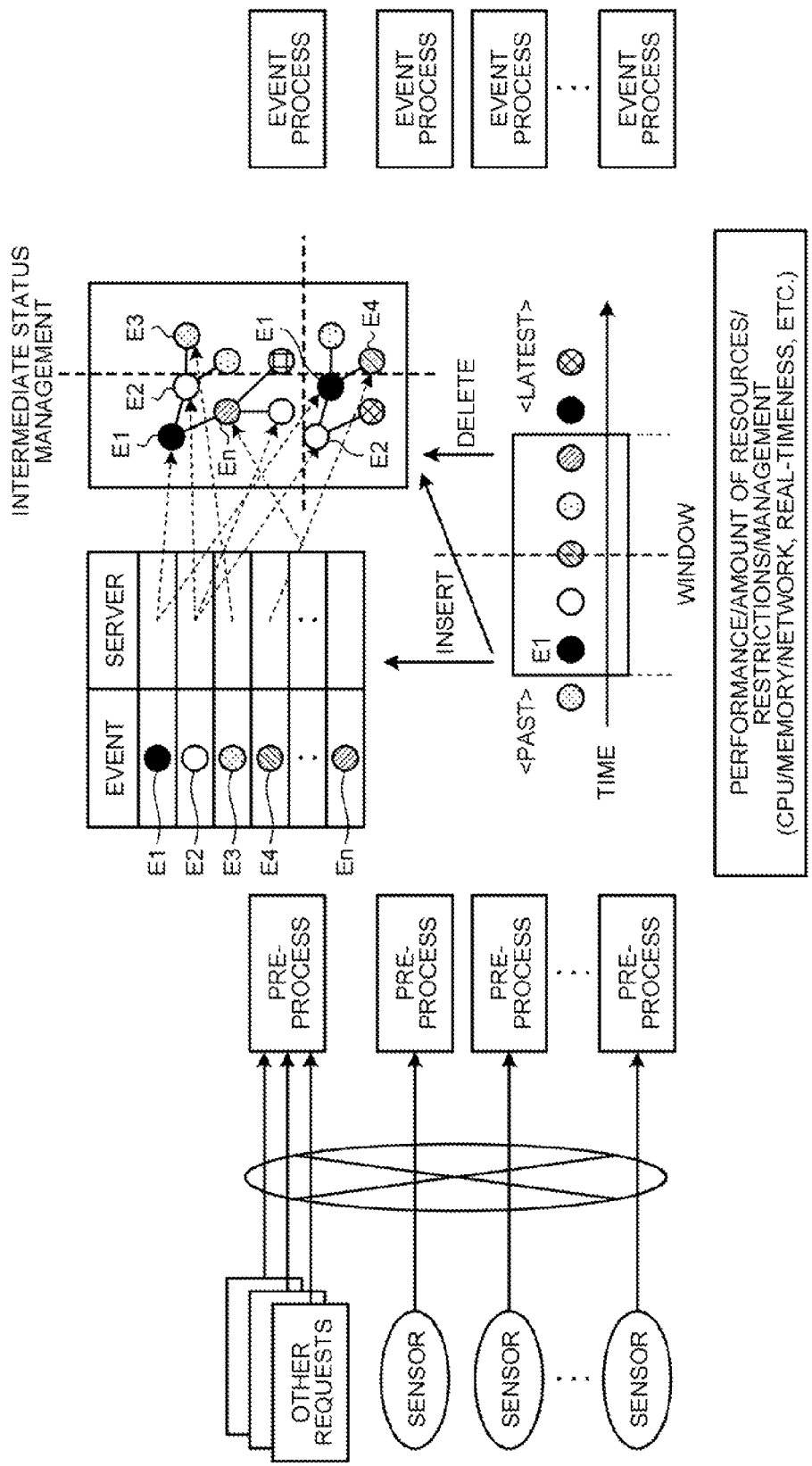
FIG. 2 is a schematic for explaining how CEP works.

A CEP process will now be explained more specifically with reference to FIG. 2. FIG. 2 is a schematic for explaining how the CEP works. Data streams received from various sensors undergo a pre-process, and are determined as to whether various conditions are established within a window representing a predetermined range of time or the number of events. In FIG. 2, E1 to En represent such conditions, and the establishment of some of these conditions E1 to En is defined as a complex event condition (rule). When such a rule is satisfied, a corresponding event will be processed.

Conditions included in a rule and combinations of such conditions are registered in a memory and the like. The number of conditions in a complex event condition being satisfied at a certain point in time is managed as intermediate status management. The intermediate status management may be loaded onto the virtual memory of each virtual machine (VM). The server 1 also manages the performance of, the amount of resources in, and restrictions on each of the VMs and the like. More specifically, the server 1 manages the central processing unit (CPU), the memory, networks, and real-time performance.

The server 1 includes a calculating unit 1a, an obtaining unit 1b, a detecting unit 1c, and a distributing unit 1d, and executes a CEP process on a VM 1. More specifically, as illustrated on the left in FIG. 3, the VM 1 retains a rule 1, a rule 2, and a rule 3, each as a condition expression formulated as a combination of phenomena for detecting events. In other words, when the VM 1 identifies the rule 1 from phenomena detected from a data stream input to the server 1, the VM 1 executes the event specified in the rule 1. When the VM 1 identifies the rule 2 from phenomena detected from a data stream input to the server 1, the VM 1 executes the event specified in the rule 2. In the same manner, when the VM 1 identifies the rule 3 from phenomena detected from a data stream input to the server 1, the VM 1 executes the event specified in the rule 3.

Under such circumstances, the calculating unit 1a in the server 1 calculates the correlations between the CEP processes performed on the respective VMs to detect events from the stream based on condition expressions for identifying events. The obtaining unit 1b then obtains the load status of each of the VMs. The detecting unit 1c then detects a VM with a processing load exceeding a predetermined level based on the load status obtained by the obtaining unit 1b. The distributing unit 1d then distributes the CEP processes to the respective VMs based on the correlations between the CEP processes calculated by the calculating unit 1a.

Figure 3:
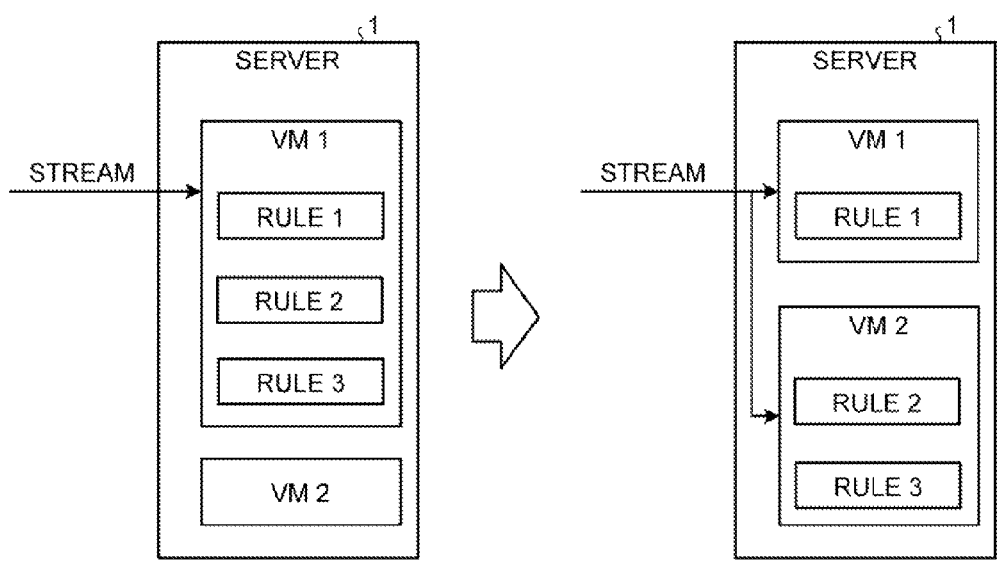
FIG. 3 is a schematic for explaining how CEP processes are distributed according to the first embodiment.

One example will now be explained with reference to FIG. 3. FIG. 3 is a schematic for explaining how the CEP processes are distributed according to the first embodiment. As illustrated in FIG. 3, on the server 1, the VM 1 is performing CEP processes using the rule 1, the rule 2, and the rule 3, and the VM 2 is not performing any CEP process. In this condition, the server 1 detects that the CPU utilization rate of the VM 1 has reached or exceeded a threshold. The VM 2 may be operating, or may be a VM not in operation but configured to be operable.

The server 1 then calculates the correlations between the CEP processes being executed on the VM 1. For example, the server 1 calculates the number of times each of the rules has been executed/the entire data streams, the number of total phenomena detected from the data streams, the number of communications exchanged between the rules, or the communication ratio between the rules. It is assumed here that the server 1 calculates that the correlation between the rule 2 and the rule 3 is higher than the correlation between the rule 1 and the rule 2.

In such an example, the server 1 shifts the rule 2 and the rule 3 retained in the VM 1 to the VM 2 as illustrated in FIG. 3. In other words, the server 1 shifts the CEP process using the rule 2 and the CEP process using rule 3 having a strong correlation with the CEP process using the rule 2, both of which have been performed on the VM 1, to the VM 2. If the VM 2 is not in operation, the server causes the VM 2 to operate as a pre-process before shifting the rules.

As a result, when the processing load of a VM performing CEP processes exceeds a tolerance, the server 1 can gather CEP processes with a strong correlation. Gathering such CEP processes can reduce communication processes across the rules. Therefore, the server 1 according to the first embodiment can prevent performance deterioration of the CEP processes.

[b] Second Embodiment

Explained below in a second embodiment of the present invention is an example in which CEP processes are distributed by shifting rules dynamically using the correlation between the rules retained in the respective VMs as the correlation between the CEP processes. The entire structure, a configuration of a server, and a processing procedure according to the second embodiment, and effects achieved thereby will be explained below.

Entire Structure

Figure 4:
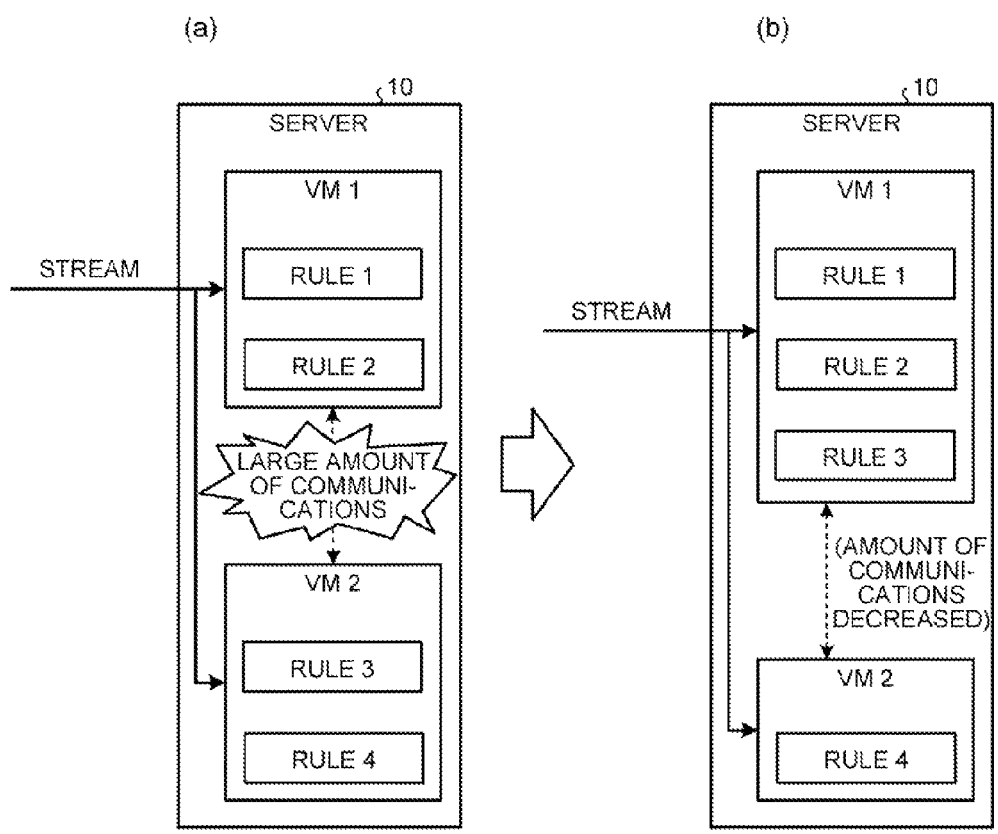
FIG. 4 is a schematic for explaining how CEP processes are distributed according to a second embodiment of the present invention.

FIG. 4 is a schematic for explaining how CEP processes are distributed according to the second embodiment. As illustrated in FIG. 4(a), a server 10 according to the second embodiment executes CEP processes on each of the VM 1 and the VM 2. More specifically, the VM 1 retains a rule 1 and a rule 2 as condition expressions. The VM 2 retains a rule 3 and a rule 4 as condition expressions. As a way to assign rules to each of these VMs, the administrator may assign the rules manually based on the correlation between the rules and the like during an initial stage. For example, two rules with a strong correlation are selected in advance and stored in each of the VMs to cause each of the VMs to perform CEP processes using the two rules. The administrator, for example, can specify which rules are to be assigned to which of the VMs at his/her discretion during the initial stage.

In other words, when the VM 1 identifies the rule 1 from phenomena detected from data streams input to the server 10, the VM 1 executes the event specified in the rule 1. When the VM 1 identifies the rule 2 from phenomena detected from data streams input to the server 10, the VM 1 executes the event specified in the rule 2.

In the same manner, when the VM 2 identifies the rule 3 from phenomena detected from data streams input to the server 10, the VM 2 executes the event specified in the rule 3. When the VM 2 identifies the rule 4 from phenomena detected from data streams input to the server 10, the VM 2 executes the event specified in the rule 4.

In this condition, the server 10 detects that the loads of the VMs have exceeded a tolerance, e.g., the amount of communication exchanged between the VM 1 and the VM 2 has reached a threshold. The server 10 then checks for the respective correlations between the rules 1 to 4 based on the correlations that have been calculated. It is assumed here that the server 10 detects that the correlation between the rule 1 and the rule 2 is stronger than those between the other rules.

In this case, as illustrated in FIG. 4(b), the server 10 shifts the rule 3 retained in the VM 2 to the VM 1. In other words, the server 10 shifts the CEP process using the rule 3, which has been executed on the VM 2, to the VM 1. In this manner, the CEP processes are distributed to prevent deterioration of the processing performance.

Server Configuration

Figure 5:
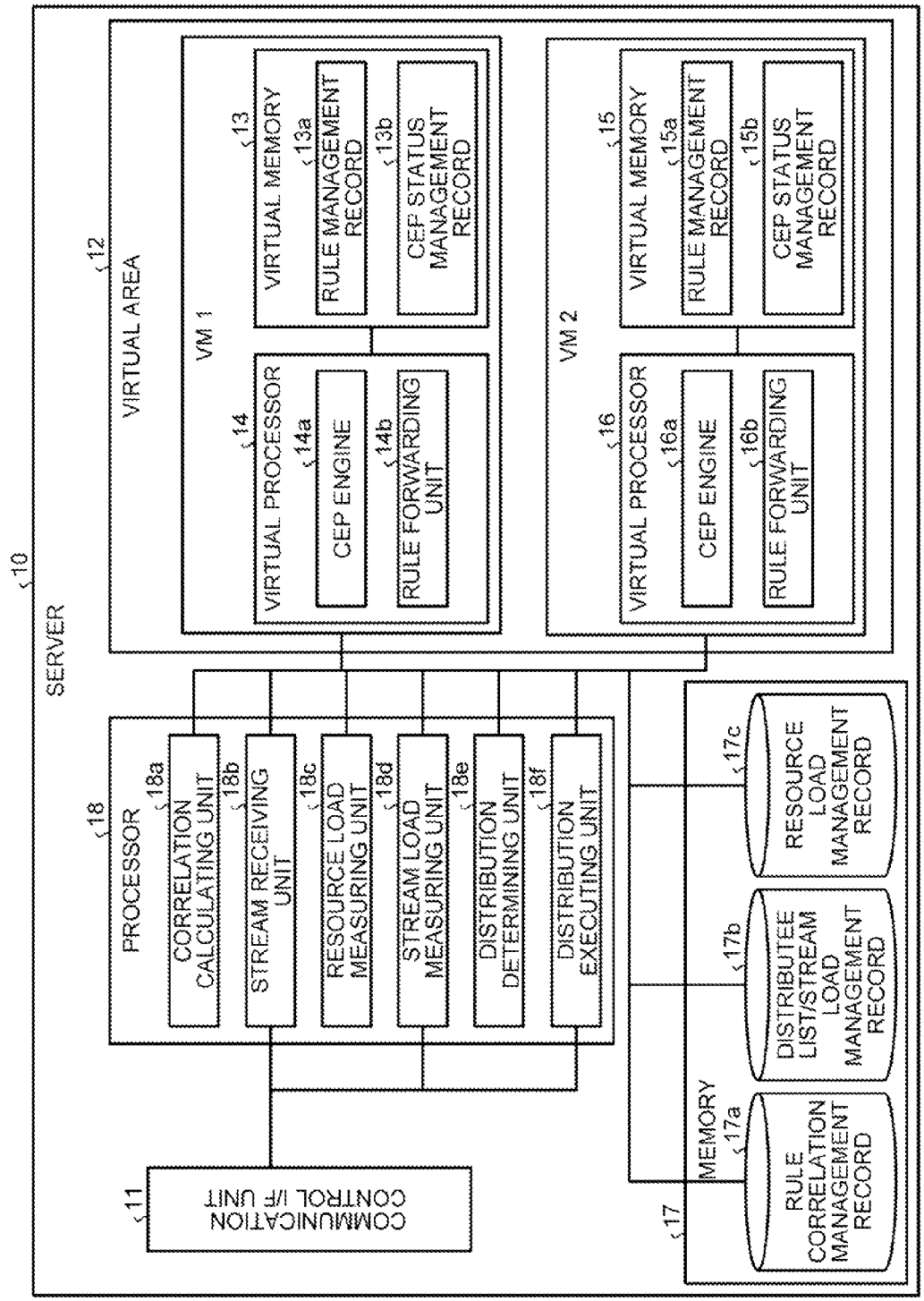
FIG. 5 is a block diagram of a configuration of a server according to the second embodiment.

FIG. 5 is a block diagram of a configuration of the server according to the second embodiment. As illustrated in FIG. 5, the server 10 includes a communication control interface (I/F) unit 11, a virtual area 12, a memory 17, and a processor 18.

The communication control I/F unit 11 is an interface that controls communications between the server 10 and other devices. For example, the communication control I/F unit 11 receives a fluctuation of stock prices or currency exchange rates, data detected with various sensors, or HTTP traffics on a Web server as data streams, and outputs the data streams to the processor 18.

The virtual area 12 is an area in which a plurality of VMs generated by the processor 18 are initiated, and any number of VMs can be initiated therein. In the second embodiment, the VM 1 and the VM 2 are being executed in the virtual area 12 as illustrated in FIG. 5.

The VM 1 includes a virtual memory 13 and a virtual processor 14 for controlling the operations of the virtual machine. The virtual memory 13 is a predetermined area in the memory 17 of the server 10 virtually allocated for execution of the VM 1, and has a rule management record 13a and a CEP status management record 13b.

The rule management record 13a is a database storing therein CEP processes executed by the VM 1, that is, the rules used by the VM 1 upon detecting events. FIG. 6 is a schematic of an example of information stored in the rule management record for a VM. As illustrated in FIG. 6, the rule management record 13a stores therein "rule name, element list, event" in an associated manner. The "rule name" stored in this record is a name uniquely identifying a rule. The "element list" indicates the elements constituting the rule. The "event" indicates the event to be executed.

In an example illustrated in FIG. 6, a "rule 1" is made up of an "element A" for detecting a phenomenon A, an "element B" for detecting a phenomenon B, and an "element C" for detecting a phenomenon C. The rule 1 specifies to execute "event 1" when the phenomenon A, the phenomenon B, and the phenomenon C are detected consecutively. In the second embodiment, the rule management record 13a in the VM 1 retains "rule 1, element A→element B→element C, event 1" and "rule 2, element A→element B→element D, event 2".

The CEP status management record 13b is a database storing therein the status of the CEP processes currently being executed, and stores therein a window size notified to the server 10, and the intermediate data. FIG. 7 is a schematic of an example of the intermediate data stored in the CEP status management record for the VM. As illustrated in FIG. 7, the CEP status management record 13b stores therein "item number, intermediate data, correlating rule" in an associated manner. The "item number" stored in this record is a number uniquely assigned to data to be stored. The "intermediate data" represents a phenomenon (element) currently being detected. The "correlating rule" represents a rule including the current intermediate data.

In the example illustrated in FIG. 7, the "element A", which is one of the elements of the "rule 1", is being detected as "item number=1", and the "element A" and the "element B", which are the elements of both of the "rule 1" and the "rule 2", are being detected consecutively as "item number=2". In this example, the intermediate data is explained to be managed in a table. However, management of the intermediate data is not limited thereto, and may also be carried out in a tree structure, for example.

The virtual processor 14 is a processor with a predetermined processing capacity of the processor 18 on the server 10 virtually allocated for execution of the VM 1, and has a CEP engine 14a and a rule forwarding unit 14b.

The CEP engine 14a is a processing unit for executing the CEP processes. For example, the CEP engine 14a receives the data streams input to the server 10 via the processor 18, and stores the data streams in the virtual memory 13, for example. The CEP engine 14a then reads the data of the window size from the data streams stored in the virtual memory 13. From the read data, the CEP engine 14a stores data matching the respective elements, constituting the rules stored in the rule management record 13a, in the CEP status management record 13b as intermediate data. In this manner, the CEP engine 14a detects phenomena from data streams and generates intermediate data.

When the intermediate data stored in the CEP status management record 13b matches one of the rules stored in the rule management record 13a, the CEP engine 14a executes the event specified by the matching rule. For example, when "element A→element B→element C", indicating that the phenomenon A to the phenomenon C are detected consecutively, is stored in the CEP status management record 13b as intermediate data, which matches the rule 1, the CEP engine 14a performs the event 1 specified by the rule 1. The CEP engine 14a then deletes the intermediate data from the CEP status management record 13b.

The rule forwarding unit 14b shifts a rule and various information related to the rule to a target VM when an instruction for shifting the rule is received from the processor 18. For example, when the rule forwarding unit 14b receives a forwarding instruction for shifting the rule 1 to the VM 2 from the processor 18, the rule forwarding unit 14b copies the rule 1 stored in the rule management record 13a to a rule management record 15a on the VM 2, and also copies the information having the "rule 1" specified in the "correlating rule" in the CEP status management record 13b to a CEP status management record 15b on the VM 2. The rule forwarding unit 14b then synchronizes each piece of copied information between the source VM and the target VM, and deletes the information in the source VM.

The VM 2 includes a virtual memory 15 and a virtual processor 16 in the same manner as the VM 1. The virtual memory 15 has the same function as that of the virtual memory 13 on the VM 1, and the virtual processor 16 has the same function as that of the virtual processor 14 on the VM 1. Therefore, detailed explanations thereof are omitted herein. In the second embodiment, it is assumed that the rule management record 15a on the VM 2 retains "rule 3, element E→element F→element C, event 3" and "rule 4, element G→element H→element I, event 4".

Referring back to FIG. 5, the memory 17 is a memory storing therein data and programs used in various processes performed in the processor 18, and information such as the window size specified. The memory 17 includes a rule correlation management record 17a, a distributee list/stream load management record 17b, and a resource load management record 17c. The memory 17 does not necessarily have to be a memory, and may be a semiconductor memory element or a storage device such as a hard disk.

The rule correlation management record 17a is a database storing therein correlations between the rules. FIG. 8 is a schematic of an example of information stored in the rule correlation management record. As illustrated in FIG. 8, the rule correlation management record 17a stores therein "rule name, element list/event, degree of rule correlation, strength of correlation, resource loads (CPU utilization rate, memory utilization rate, network utilization rate)" in an associated manner.

The "rule name" stored in this record is a name uniquely identifying a rule. The "element list/event" is phenomena constituting the rule and the event to be executed. The "degree of rule correlation" contains <the number of correlating rules (the number of correlating elements)> calculated based on the number of elements shared among the rules, as the strength of the correlation between such rules. The "strength of correlation" is information listing all of the correlating rules in the ascending order of the correlation strength. The "CPU utilization rate" is the utilization rate of the virtual processor being utilized in executing the rule. The "memory utilization rate" is the utilization rate of the virtual memory being utilized in executing the rule. The "network utilization rate" is the utilization rate of the network being utilized in executing the rule.

In the example illustrated in FIG. 8, the record "rule 1" corresponding to "element A→element B→element C/event 1" indicates that there are two <2> other rules including any one of "the element A, the element B, and the element C" as their own elements, and the number of elements (phenomena) shared with these rules is three (3). This record also indicates that the "rule 1" has the strongest correlation with the rule 2 and the less stronger correlation with the rule 3, and that the CPU utilization rate by the rule 1 is "43 percent", the memory utilization rate by the rule 1 is "40 percent", and the network utilization rate by the rule 1 is "70 percent".

The record "rule 2" corresponding to "element A→element B→element D/event 2" indicates that there is one <1> other rule having any one of "the element A, the element B, and the element D" as its own element, and the number of elements (phenomena) shared with the rule is two (2). This record also indicates that the "rule 2" has the strongest correlation with the rule 1, and that the CPU utilization rate by the rule 2 is "60 percent", the memory utilization rate by the rule 2 is "50 percent", and the network utilization rate by the rule 2 is "40 percent".

The record "rule 3" corresponding to "element E→element F→element C/event 3" indicates that there is one <1> other rule having any one of "the element E, the element D, and the element C" as its own element, and the number of elements (phenomena) shared with the rule is one (1). This record also indicates that the "rule 3" has the strongest correlation with the rule 1, and that the CPU utilization rate by the rule 3 is "10 percent", the memory utilization rate by the rule 3 is "12 percent", and the network utilization rate by the rule 3 is "30 percent".

The record "rule 4" corresponding to "element G→element H→element I/event 4" indicates that there is zero <0> other rule having any one of "the element G, the element H, and the element I" as their own element, and the number of elements (phenomena) shared with such rule is zero (0). This record also indicates that the CPU utilization rate by the rule 4 is "20 percent", the memory utilization rate by the rule 4 is "35 percent", and the network utilization rate by the rule 4 is "10 percent".

The "rule name, element list/event" stored in the rule correlation management record 17a are values specified by the administrator, for example. The "degree of rule correlation" is a value calculated by a correlation calculating unit 18a to be explained later when the system is started, and updated when the rules are changed. The "resource loads" are values that are kept blank at the time of system startup and measured by a resource load measuring unit 18c to be explained later, and updated as needed.

Referring back to FIG. 5, the distributee list/stream load management record 17b is a database storing therein information such a distributee VM to which a rule is distributed and a rate of the rule distributed thereto in the entire streams. FIG. 9 is a schematic of an example of information stored in the distributee list/stream load management record. As illustrated in FIG. 9, the distributee list/stream load management record 17b stores therein "rule name, distributee list, stream load" in an associated manner.

The "rule name" stored in this record is a name uniquely identifying a rule. The "distributee list" is a VM retaining the rule and executing the CEP process using the rule. The "stream load" is the rate or the frequency of the rule match in the entire streams. The "rule name" and the "distributee list" are stored and updated by a distribution executing unit 18f to be explained later. The "stream load" is a value kept blank at the time of system startup and measured by a stream load measuring unit 18d to be explained later after the system is started, and updated as needed.

The example illustrated in FIG. 9 indicates that the "rule 1" is retained in the "VM 1" and matches at a rate of "40 percent" in the entire streams, that the "rule 2" is retained in the "VM 1" and matches at a rate of "10 percent" in the entire streams, and that the "rule 3" is retained in the "VM 2" and matches at a rate of "30 percent" in the entire streams.

The resource load management record 17c is a database storing therein the processing load of a VM to which a rule is distributed to execute the CEP process. FIG. 10 is a schematic of an example of information stored in the resource load management record. As illustrated in FIG. 10, the resource load management record 17c stores therein "VM name, rule list, resource loads (CPU utilization rate, memory utilization rate, network utilization rate)" in an associated manner.

The "VM name" stored in this record is the name of a VM operating in the virtual area 12 of the server 10. The "rule list" is a list of rules retained in the VM. The "CPU utilization rate" represents the utilization rate of the virtual processor by the VM, the "memory utilization rate" represents the utilization rate of the virtual memory by the VM, and the "network utilization rate" represents the utilization rate of the network between the VMs. The "VM name" and the "rule list" are stored and updated by the distribution executing unit 18f to be explained later. The "resource loads" are values kept blank at the time of system startup and measured by the resource load measuring unit 18c to be explained later after the system is started, and updated as needed.

The example illustrated in FIG. 10 indicates that the "VM 1" retains the "rule 1" and the "rule 2" and executes the CEP processes, the current "CPU load rate" is "30 percent", the "memory utilization rate" is "31 percent", and the "network utilization rate" is "80 percent". This example also indicates that the "VM 2" retains the "rule 3" and the "rule 4" and executes the CEP processes, and the current "CPU load rate" is "55 percent", the "memory utilization rate" is "45 percent", and the "network utilization rate" is "40 percent".

Referring back to FIG. 5, the processor 18 is a CPU and the like having an internal memory for storing therein control programs such as an operating system (OS), computer programs describing various procedures, and data. The processor 18 includes the correlation calculating unit 18a, a stream receiving unit 18b, the resource load measuring unit 18c, the stream load measuring unit 18d, a distribution determining unit 18e, and a distribution executing unit 18f, and performs various processes using these units.

The correlation calculating unit 18a calculates the correlations between the rules and stores the correlations in the rule correlation management record 17a. For example, the correlation calculating unit 18a calculates the correlation between the rules when the system is started or when an instruction for calculating the correlations is received from the administrator, for example.

Explained below is an example where each of the rule 1 to the rule 4 is made up of the elements illustrated in FIG. 8. In this example, because the element A constituting the rule 1 is also included in the rule 2, and the element B constituting the rule 1 is also included in the rule 2, and because the element C constituting the rule 1 is also included in the rule 3, the correlation calculating unit 18a calculates the "number of correlating elements" in the "degree of rule correlation" as "3". The correlation calculating unit 18a also detects that the concatenation of the elements "element A→element B" in the rule 1 is included in the rule 2 as well. Furthermore, the correlation calculating unit 18a detects that the "element C" is the third element in the rule 1, and the same applies to the rule 3. As a result, the correlation calculating unit 18a sets "2" to "the number of correlating rules". Therefore, the correlation calculating unit 18a stores <2(3)> as <the number of correlating rules (the number of correlating elements)> in the "degree of rule correlation" for the rule 1 as illustrated in FIG. 8. In addition, because the two elements of the element A and the element B are included in the rule 2, and the single element, the element C, is included in the rule 3, the correlation calculating unit 18a stores "the rule 3→the rule 2" as the "strength of correlation". In other words, the rule 1 has a stronger correlation with the rule 2 than with the rule 3.

Because the element A constituting the rule 2 is included in the rule 1, and the element B is included in the rule 1 as well, and because the element D is not included in any other rule, the correlation calculating unit 18a sets "2" to the "number of correlating elements" in the "degree of rule correlation". The correlation calculating unit 18a also detects that the concatenation of the elements "element A→element B" in the rule 2 is included in the rule 1 as well. Therefore, the correlation calculating unit 18a sets "1" to the "number of correlating rules". As a result, the correlation calculating unit 18a stores <1(2)> in <the number of correlating rules (the number of correlating elements)> as the "degree of rule correlation" for the rule 2 as illustrated in FIG. 8. In addition, because the two elements, the element A and the element B, are included in the rule 1, the correlation calculating unit 18a stores the "rule 1" as the "strength of correlation".

Because the element C constituting the rule 3 is included in the rule 1 as well, and because neither of the element E and the element F is included in any of the rules, the correlation calculating unit 18a sets "1" to the number of correlating elements" in the "degree of rule correlation". The correlation calculating unit 18a also detects that the "element C" is the third element in the rule 3 and that the "element C" is included in the rule 1 as the third element as well. Therefore, the correlation calculating unit 18a sets "1" to "the number of correlating rules". As a result, the correlation calculating unit 18a stores <1(1)> in <the number of correlating rules (the number of correlating elements)> as the "degree of rule correlation" for the rule 3 as illustrated in FIG. 8. Because the element C is included in the rule 1, the correlation calculating unit 18a stores the "rule 1" as the "strength of correlation".

Because none of the elements constituting the rule 4 is included in any other rules, the correlation calculating unit 18a sets "0" to the "number of correlating elements" in the "degree of rule correlation". The correlation calculating unit 18a also detects that any order or any concatenation of the elements constituting the rule 4 is not included in any other rules. Therefore, the correlation calculating unit 18a sets "0" to "the number of correlating rules". As a result, the correlation calculating unit 18a sets <0(0)> to <the number of correlating rules (the number of correlating elements)> in the "degree of rule correlation" for the rule 4 as illustrated in FIG. 8.

Referring back to FIG. 5, the stream receiving unit 18b stores the data streams received via the communication control I/F unit 11 in the memory 17, duplicates the data streams, and transmits the respective data streams to the VM 1 and the VM 2. As an alternative, the stream receiving unit 18b may refer to the distributee list/stream load management record 17b, transmit the data streams related to the rule 1 or the rule 3 to the VM 1, and transmit the data streams related to the rule 2 or the rule 4 to the VM 2. In other words, the stream receiving unit 18b may transmit only the data related to the rules retained in a VM to such a VM.

The resource load measuring unit 18c measures the resource loads of the respective VMs and the resource loads of the respective rules, and stores the information in the rule correlation management record 17a and the resource load management record 17c. For example, the resource load measuring unit 18c obtains the "CPU utilization rate", the "memory utilization rate", and the "network utilization rate" from each of the VM 1 and the VM 2 at predefined timing, e.g., every five minutes, and stores the information in the resource load management record 17c.

In other words, the resource load measuring unit 18c obtains the information about how much of the allocated processing capabilities of the virtual processor 14 and the virtual processor 16, which each are several ten percent of the processing capability of the processor 18 in the server 10, are being utilized. Similarly, the resource load measuring unit 18c obtains the information about how much of the allocated areas of the virtual memory 13 and the virtual memory 15, which each are several ten percent of the area on the memory 17 in the server 10, are being utilized. The resource load measuring unit 18c also measures the rate of the network bandwidth being utilized by either one of the VM 1 and the VM 2.

The resource load measuring unit 18c obtains the information about how much of the rules is retained in the virtual processor 14 in the VM 1, in other words, how much of the rules is being executed by the virtual processor 14 at predefined timing, e.g., every five minutes, and stores the information in the rule correlation management record 17a. In the same manner, the resource load measuring unit 18c obtains the information about how much of the rules is retained in the virtual processor 16 in the VM 2 at predefined timing, e.g., every five minutes, and stores the information in the rule correlation management record 17a.

The resource load measuring unit 18c may use various known techniques as a technique for obtaining the resource loads. For example, monitoring software and the like may be used. The resource load measuring unit 18c may also obtain the resource loads from each of the VMs, and obtain the resource loads collected regularly by each of the VMs.

Referring back to FIG. 5, the stream load measuring unit 18d measures the ratio of the distributed rules with respect to the entire streams, for example, and stores the information in the distributee list/stream load management record 17b. For example, the stream load measuring unit 18d calculates the "stream load" for each of the rules based on "the number of times the rule 1 has been executed/the total number of phenomena detected in the streams" or "the number of times the rule 1 has been executed/the number of times all of the rules have been executed". The number of times each of the rules has been executed may be counted by the VM and stored in the virtual memory, for example, or measured by the stream load measuring unit 18d and stored in the memory 17.

When any of the VMs is detected to have a processing load exceeding a predetermined level, the distribution determining unit 18e determines where to shift the rules to the respective VMs based on the correlations between the rules. For example, when the resource load stored in the rule correlation management record 17a or the resource load management record 17c for any of the VMs exceeds a threshold, the distribution determining unit 18e detects such a VM as a VM with a processing load exceeding the predetermined level. Furthermore, when the stream load of any rule stored in the distributee list/stream load management record 17b is detected to exceed a threshold, the distribution determining unit 18e detects that the VM retaining such a rule has a processing load exceeding the predetermined level. For example, when the network utilization rate of a VM is detected to become 70 percent or higher, the distribution determining unit 18e determines that a VM with a high processing load has been detected.

The distribution determining unit 18e then determines where to shift the rules based on the "degree of rule correlation" stored in the rule correlation management record 17a. As an example, the distribution determining unit 18e determines to gather the rules having two or a higher value in the maximum one of "the number of correlating rules" or the "number of correlating elements" in the "degree of rule correlation" to the VM 1, and to gather the rule having a value less than two to the VM 2. As another example, the distribution determining unit 18e determines to gather the rules having one or a higher value as the product of "the number of correlating rules" and the "number of correlating elements" specified in the "degree of rule correlation" to the VM 1, and to gather the rule with a value less than one to the VM 2. As another example, the distribution determining unit 18e refers to the "strength of correlation" of the rules having a value two or a higher value as the product of "the number of correlating rules" and the "number of correlating elements" specified in the "degree of rule correlation", and determines to gather the correlating rules (the rule 1 and the rule 2, for example) to the VM 1 and to gather the other rules to the VM 2.

It is assumed that the distribution determining unit 18e determines to gather the rule 1, the rule 2, and the rule 3 to the VM 1, and to shift the rule 4 to the VM 2 using the exemplary methods described above, for example. In this case, the distribution determining unit 18e refers to the resource load management record 17c illustrated in FIG. 10 and determines to shift the rule 3, because the rule 1 and the rule 2 are retained in the VM 1 and the rule 3 and the rule 4 are retained in the VM 2. The distribution determining unit 18e then notifies the distribution executing unit 18f of the determination that the rule 3 is to be shifted.

As the method for allowing the distribution determining unit 18e to determine which of the rules are to be distributed, various other methods, e.g., methods using the stream load or the resource loads, may also be used. These methods will be explained in a fourth embodiment of the present invention and other parts hereof, so explanations thereof are omitted here.

Referring back to FIG. 5, the distribution executing unit 18f shifts the rules based on the rules to be distributed determined by the distribution determining unit 18e. For example, it is assumed that the distribution executing unit 18f receives a notification for shifting the rule 3 from the VM 2 to the VM 1 as a rule to be distributed. In such a case, the distribution executing unit 18f transmits an instruction to a rule forwarding unit 16b in the VM 2 so as to shift the rule 3 and various types of information related to the rule 3 to the VM 1.

Upon receiving a notification that the shifting operation has been normally completed from the rule forwarding unit 14b in the VM 1 or the rule forwarding unit 16b in the VM 2, the distribution executing unit 18f updates the distributee list of the distributee list/stream load management record 17b and the rule list in the resource load management record 17c.

Processing Procedures

Figure 11:
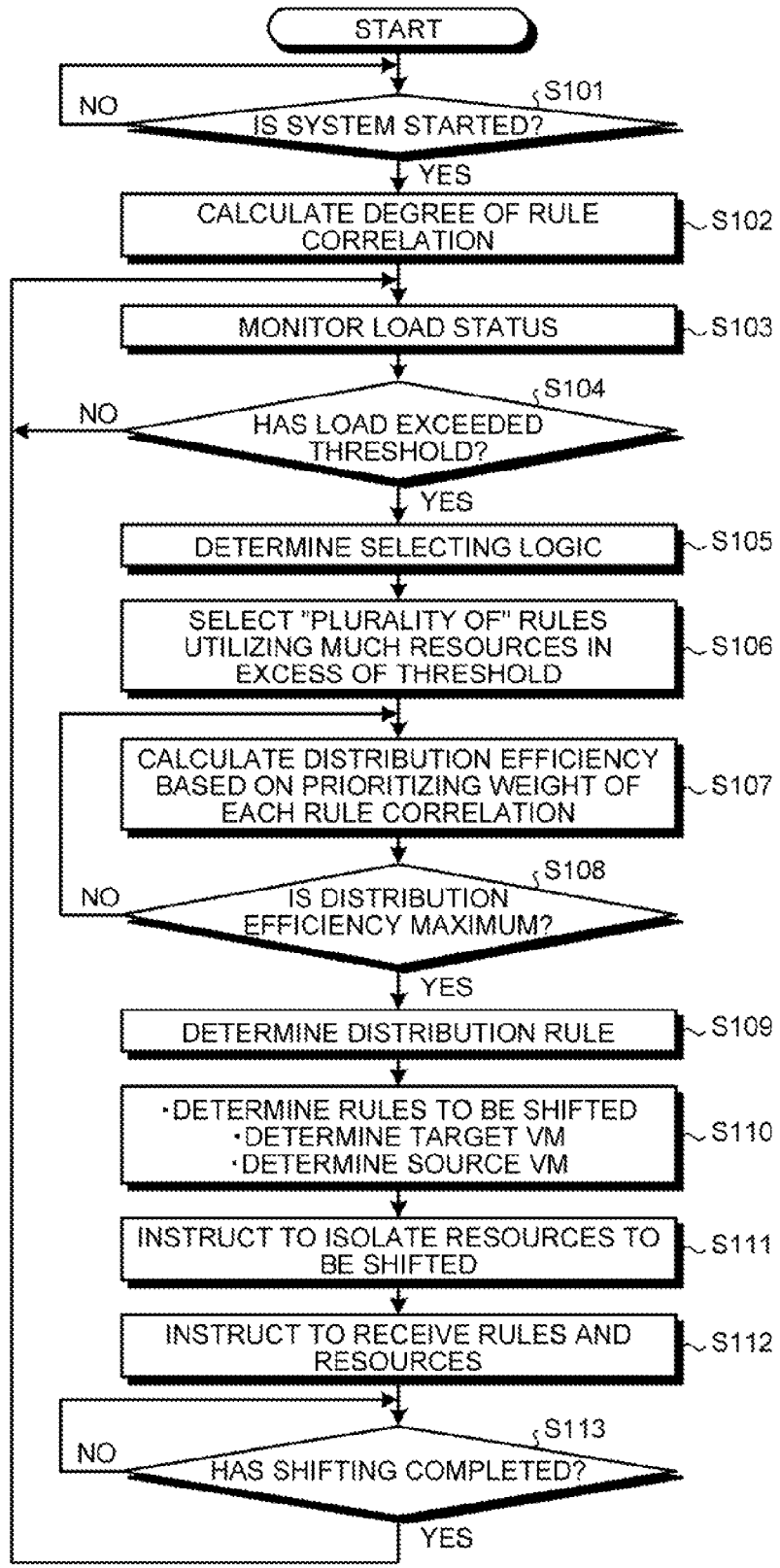
FIG. 11 is a flowchart of a distributing process performed in the server according to the second embodiment.
Figure 12:
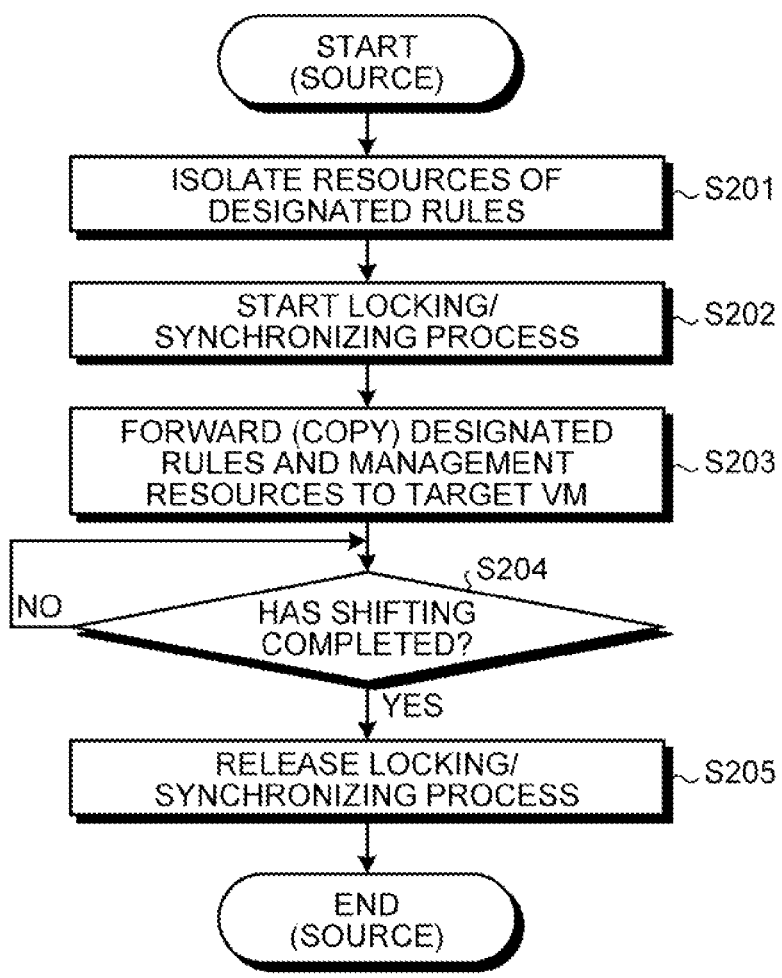
FIG. 12 is a flowchart of a distributing process performed by a source VM according to the second embodiment.
Figure 13:
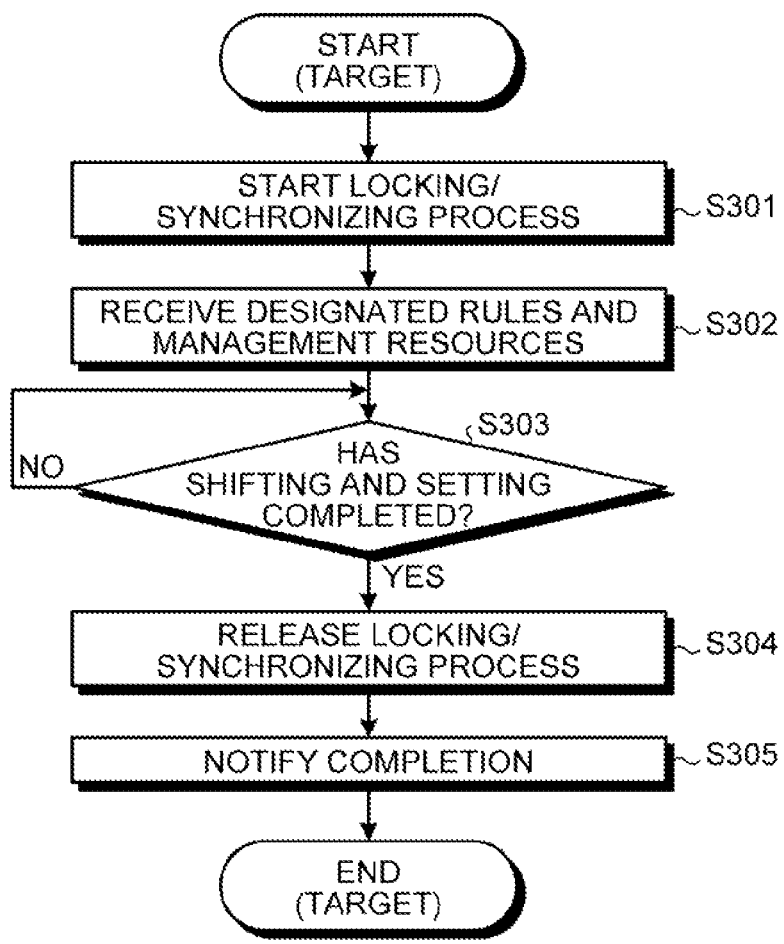
FIG. 13 is a flowchart of a distributing process performed by a target VM according to the second embodiment.

Various processes performed in the server according to the second embodiment will now be explained with reference to FIGS. 11 to 13. FIG. 11 is a flowchart of a distributing process performed in the server according to the second embodiment. FIG. 12 is a flowchart of a distributing process performed by a source VM according to the second embodiment. FIG. 13 is a flowchart of a distributing process performed by a target VM according to the second embodiment.

Distributing Process Procedure Performed in Server

As illustrated in FIG. 11, when the system is started (YES at Step S101), the correlation calculating unit 18a in the server 10 calculates the correlation between the respective rules, and stores the results in the rule correlation management record 17a (Step S102).

The resource load measuring unit 18c and the stream load measuring unit 18d then obtain the load status of each VM and the load status of each rule, and monitor these load statuses (Step S103). If a VM is detected to have a processing load exceeding a predetermined level (YES at Step S104), the distribution determining unit 18e determines a selecting logic (Step S105).

In other words, the distribution determining unit 18e receives selecting conditions for distributing the rules from the administrator, for example, and determines how to distribute the rules based on the received selecting conditions. In the example explained above, such distribution of the rules is determined based on the "degree of rule correlation". However, in the example to be explained below, the distribution determining unit 18e determines how to distribute the rules based on both the "load status" and the "degree of rule correlation".

The distribution determining unit 18e selects a plurality of rules that consume the resources to a larger degree in excess of thresholds (Step S106). The distribution determining unit 18e then calculates a distribution efficiency from the correlations between the selected rules using weights (Step S107).

If the calculated distribution efficiency is maximum (YES at Step S108), the distribution determining unit 18e determines a distribution rule for achieving the calculated distribution efficiency (Step S109). The distribution determining unit 18e then determines the rule to be shifted, the target VM, and the source VM based on the distribution rule thus determined (Step S110).

The distribution executing unit 18f then instructs the source VM to isolate the resources to be shifted based on the distribution rule determined by the distribution determining unit 18e (Step S111). In other words, the distribution executing unit 18f sends the source VM an instruction to shift the rules to be shifted to the target VM.

The distribution executing unit 18f instructs the target VM to receive the resources to be shifted based on the distribution rule determined by the distribution determining unit 18e (Step S112). In other words, the distribution executing unit 18f sends the target VM an instruction to receive the rules to be shifted from the source VM.

After completing shifting the rules, in other words, after completing distributing the CEP processes (YES at Step S113), Step S103 and the subsequent processes are executed.

Distributing Process Procedure Performed by Source VM

As illustrated in FIG. 12, when the rule forwarding unit in the source VM receives the instruction to isolate the resources of the rules from the server 10, the rule forwarding unit isolates the resources of the designated rules (Step S201). For example, the rule forwarding unit isolates the rules to be shifted from its virtual memory so as to exclude such rules from being used for the CEP processes.

The rule forwarding unit in the source VM then starts a locking/synchronizing process (Step S202), and forwards the designated rules and the management resources to the target VM (Step S203). For example, the rule forwarding unit performs locking control for stopping the CEP processes being performed using the rules to be shifted, and copies the rule to be shifted that is stored in the rule management record and information stored in the CEP status management record with the "correlating rule" specified as the rules to be shifted to the target VM.

Once the rule forwarding unit in the source VM completes forwarding the rules and the management resources to the target VM (YES at Step S204), the rule forwarding unit ends the locking/synchronizing process (Step S205).

Distributing Process Procedure Performed by Target VM

As illustrated in FIG. 13, when the rule forwarding unit in the target VM receives the instruction to receive the resources for the rules from the server 10, the rule forwarding unit starts the locking/synchronizing process (Step S301). For example, the rule forwarding unit performs locking control for stopping the CEP processes being performed with the rules being shifted.

The rule forwarding unit in the target VM then receives the designated rules and the management resources from the target VM (Step S302). For example, the rule forwarding unit stores the received rules in the rule management record, and stores the received correlating rules and the like in the CEP status management record.

After the target VM completes forwarding the rules and the management resources (YES at Step S303), the rule forwarding unit in the target VM releases the locking/synchronizing process (Step S304), and notifies the processor 18 in the server 10 of the completion (Step S305).

Effects Achieved by Second Embodiment

As described above, according to the second embodiment, a set of rules for CEP can be shifted to other VM(s) dynamically based on the loads on the resources. Therefore, if the CEP processes on the same VM become lacking of the resources, the loads of the CEP processes can be dynamically distributed. Furthermore, when the loads of the CEP processes increase, a combination of the rules can be selected so as to allow the loads to be distributed with the smallest isolation overhead based on the correlations between the rules and the rate of loads on the CEP processes, and such a combination of the rules can be shifted to other VM(s).

[c] Third Embodiment

In the example explained in a third embodiment of the present invention, the CEP processes are distributed by dividing rules into elements and shifting them dynamically using the correlations between the elements constituting each of the rules as the correlation between the CEP processes.

Figure 14:
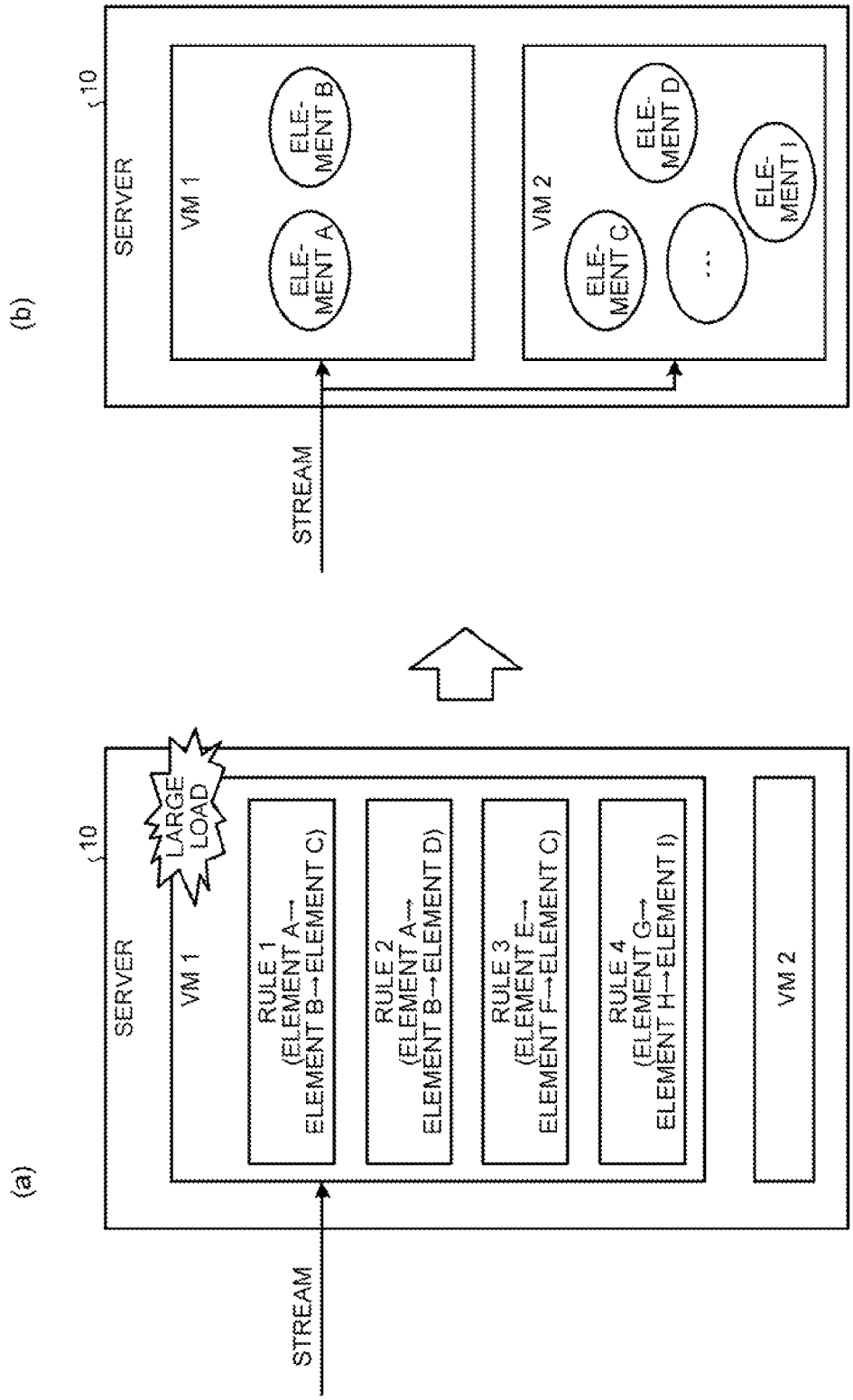
FIG. 14 is a schematic for explaining how CEP processes are distributed according to a third embodiment of the present invention.

FIG. 14 is a schematic for explaining how the CEP processes are distributed according to the third embodiment. As illustrated in FIG. 14(a), the server 10 according to the third embodiment is operating the VM 1 and the VM 2, and CEP processes are executed on the VM 1. More specifically, the VM 1 retains a rule 1 made up of element A→element B→element C, and a rule 2 made up of element A→element B→element D as condition expressions. The VM 1 also a rule 3 made up of element E→element F→element C and a rule 4 made up of element G→element H→element I as condition expressions. The arrows between the elements indicate the consecutiveness of the elements. For example, element A→element B→element C represents that, when the element A, the element B, and the element C are performed consecutively, the phenomena match the rule 1.

In other words, when the VM 1 identifies the rule 1 from the phenomena detected from the data streams input to the server 10, the VM 1 executes the event specified in the rule 1. When the VM 1 identifies the rule 2 from the phenomena detected from the data streams input to the server 10, the VM 1 executes the event specified in the rule 2.

In the same manner, when the VM 1 identifies the rule 2 from the phenomena detected from the data streams input to the server 10, the VM 1 executes the event specified in the rule 3. When the VM 1 identifies the rule 4 from the phenomena detected from the data streams input to the server 10, the VM 1 executes the event specified in the rule 4.

In this condition, the server 10 detects that the load of the VM 1 has exceeded a tolerance, e.g., the CPU utilization rate of the VM 1 has exceeded a predetermined level. In response, the server 10 calculates the correlations between the elements based on any one of or both of the number of combinations of the elements constituting each of the rule 1 to the rule 4 and the concatenations of the elements in the rules.

The server 10 then shifts the elements so that the element A and the element B having a strong correlation are executed on the VM 1, and the elements C to I having no particular strong correlation with other elements are executed on the VM 2, for example, in the manner illustrated in FIG. 14(b).

Explained below with reference to FIGS. 15 to 17 is a specific example of how the rules are divided into the elements and how the elements are shifted dynamically based on the correlation between the elements. FIG. 15 is a schematic of an example of information stored in a rule correlation management record according to the third embodiment. FIG. 16 is a schematic of an example of information stored in a distributee list/stream load management record according to the third embodiment. FIG. 17 is a schematic of an example of information stored in a resource load management record according to the third embodiment.

As illustrated in FIG. 15, the rule correlation management record 17a in the server 10 stores therein "element name, degree of element correlation, degree of rule correlation, resource loads (CPU utilization rate, memory utilization rate, network utilization rate)" in an associated manner.

The "element name" stored in this record is the name of an element constituting a rule. The "degree of element correlation" contains <the number of combinations including the element & (the number of "IN"s to and the number of "OUT"s from the element)> calculated based on the redundancy of the element in the rules as the correlation strength. To consider the "element B" in "element A→element B→element C", the "IN" and the "OUT" of the element are the side of the "element A" and the side of the "element C", respectively.

The "degree of rule correlation" specifies the rules having the element as its constituent. The "CPU utilization rate" is the utilization rate of the virtual processor utilized in executing the element. The "memory utilization rate" is the utilization rate of the virtual memory utilized in executing the element. The "network utilization rate" is the utilization rate of the network utilized in executing the element.

A process of generating the information illustrated in FIG. 15 performed by the correlation calculating unit 18a will now be specifically explained. In the explanation below, it is assumed that the rules 1 to 4 being the same as those in the second embodiment are used. In other words, the "rule 1" is made up of "element A→element B→element C", and the "rule 2" is made up of "element A→element B→element D". The "rule 3" is made up of "element E→element F→element C", and the "rule 4" is made up of "element G→element H→element I".

To begin with, a process for the element A will be explained. The correlation calculating unit 18a detects that the combination "element A→element B" is included in the rule 1 and the rule 2, and that the "element A→element B" includes one IN from the element A. As a result, the correlation calculating unit 18a stores <2&1:(A→B)> in the "degree of element correlation" for the "element A", and stores the "rules 1 and 2" in the "degree of rule correlation" in a manner associated with <2&1:(A→B)>.

The correlation calculating unit 18a then detects that the combination "element A→element B→element C" is included in the rule 1, and that the "element A→element B→element C" includes one "IN" from the element A. As a result, the correlation calculating unit 18a stores <1&1: (A→B)→C> in the "degree of element correlation" for the "element A", and stores the "rule 1" in the "degree of rule correlation" in a manner associated with <1&1: (A→B)→C>.

The correlation calculating unit 18a then detects that the combination of "element A→element B→element D" is included in the rule 2, and that the "element A→element B→element C" includes one "IN" from the element A. As a result, the correlation calculating unit 18a stores <1&1: (A→B)→D> in the "degree of element correlation" for the "element A", and stores the "rule 2" in the "degree of rule correlation" in a manner associated with <1&1: (A→B) →D>.

A process for the element B will now be explained. The correlation calculating unit 18a detects that the combination "element A→element B" is included in the rule 1 and the rule 2, and that the "element A→element B" includes one "OUT" from the element B. As a result, the correlation calculating unit 18a stores <2&1:(A→B)> in the "degree of element correlation" for the "element B", and stores the "rules 1 and 2" in the "degree of rule correlation" in a manner associated with <2&1:(A→B)>.

The correlation calculating unit 18a then detects that the combination "element A→element B→element C" is included in the rule 1, and that the element B has one "IN" and one "OUT" in the "element A→element B→element C". As a result, the correlation calculating unit 18a stores <1&2 (A→B→C)> in the "degree of element correlation" for the "element B", and stores the "rule 1" in the "degree of rule correlation" in a manner associated with <1&2:(A→B→C)>.

The correlation calculating unit 18a then detects that the combination of "element A→element B→element D" is included in the rule 2, and that the element B has one "IN" and one "OUT" in the "element A→element B→element D". As a result, the correlation calculating unit 18a stores <1&2: (A→B→D)> in the "degree of element correlation" for the "element B", and stores the "rule 2" in the "degree of rule correlation" in a manner associated with <1&2:A→B→D>.

A process for the element C will now be explained. The correlation calculating unit 18a detects that the combination "element A→element B→element C" is included in the rule 1, and that the element C has one "IN" in the "element A→element B→element C". As a result, the correlation calculating unit 18a stores <1&1:A→(B→C)> in the "degree of element correlation" for the "element C", and stores the "rule 1" in the "degree of rule correlation" in a manner associated with <1&1:A→(B→C)>.

The correlation calculating unit 18a then detects that the combination "element E→element F→element C" is included in the rule 3, and that the element C has one "IN" in the "element E→element F→element C". As a result, the correlation calculating unit 18a stores <1&1:E→(F→C)> in the "degree of element correlation" for the "element C", and stores the "rule 3" in the "degree of rule correlation" in a manner associated with <1&1:E→(F→C)>.

A process for the element D will now be explained. The correlation calculating unit 18a detects that the combination "element A→element B→element D" is included in the rule 2, and that the element D has one "IN" in the "element A→element B→element D". As a result, the correlation calculating unit 18a stores <1&1:A→(B→D)> in the "degree of element correlation" for the "element D", and stores the "rule 2" in the "degree of rule correlation" in a manner associated with <1&1:A→(B→D)>.

In the manner explained above, the correlation calculating unit 18a calculates the "degree of element correlation" and the "degree of rule correlation" for each of the elements A to I included in the rules 1 to 4, and generates the rule correlation management record 17a. The "resource loads" are values kept blank at the time of system startup and measured by the resource load measuring unit 18c after the system is started, and updated as needed.

The distributee list/stream load management record 17b in the server 10 stores therein "element name, distributee list, stream load" in an associated manner as illustrated in FIG. 16. The "element name" stored in this record is a name uniquely identifying an element constituting a rule. The "distributee list" represents a VM retaining the element. The "stream load" is the ratio or the frequency of the element (phenomenon) match in the entire streams. The "element name" and the "distributee list" are stored and updated by the distribution executing unit 18f. The "stream load" is a value kept blank at the time of system startup and measured by the stream load measuring unit 18d after the system is started, and is updated as needed.

The example illustrated in FIG. 16 indicates that the "element A" is retained in the "VM 1" and matches at a rate of "40 percent" in the entire streams, the "element B" is retained in the "VM 1" and matches at a rate of "10 percent" in the entire streams, and that the "element C" is retained in the "VM 1" and matches at a rate of "30 percent" in the entire streams.

The resource load management record 17c in the server 10 stores therein "VM name, list, resource loads (CPU utilization rate, memory utilization rate, and network utilization rate)" in an associated manner, as illustrated in FIG. 17(a). The "VM name" stored in this record is a name for identifying a VM running in the virtual area 12 of the server 10, and the "list" is a list of the rules or the elements retained in the VM. The "CPU utilization rate" is the utilization rate of the virtual processor in the VM, and the "memory utilization rate" is the utilization rate of the virtual memory in the VM. The "network utilization rate" is the utilization rate of the network between the VMs. The "VM name" and the "list" are stored and updated by the distribution executing unit 18f. The "resource loads" are values that are kept blank at the time of system startup and measured by the resource load measuring unit 18c after the system is started, and updated as needed.

When a VM is detected to have a processing load exceeding a predetermined level while the resource load management record 17c is in the condition illustrated in FIG. 17(a), the distribution determining unit 18e shifts the elements to each of the VMs based on the correlations between the elements. For example, it is assumed here that the distribution determining unit 18e determines to shift the element specified with two or a higher value in the highest one of <the number of combinations including the element & (the number of "IN"s to and the number of "OUT"s from the element)> stored in the rule correlation management record 17a to a single VM. In such a case, the distribution determining unit 18e notifies the distribution executing unit 18f of an instruction for shifting the element A and the element B to the VM 1 and shifting the other elements to the VM 2. The distribution determining unit 18e selects the elements with smaller correlations, for example.

As another example, it is assumed that the distribution determining unit 18e determines to shift an element having the number of combinations including such an element and (the number of "IN"s to and the number of "OUT"s from the element) specified in the rule correlation management record 17a resulting in the product of two or a higher value to a single VM. In this case, the distribution determining unit 18e notifies the distribution executing unit 18f of an instruction for shifting the element A and the element B having the values <2&1> to the VM 1 and shifting the other elements to the VM 2. The process is performed so that the elements with higher correlations are executed on the same VM as much as possible, for example. In other words, the element with a smaller correlation is selected from those with high loads.

It is assumed that the distribution determining unit 18e determines to shift the element A and the element B to the VM 1 and to shift the other elements to the VM 2 in the manner described above. Under such an assumption, the distribution executing unit 18f transmits instructions to the VM 1 and the VM 2 so as to gather the element A and the element B to the VM 1 and to gather the elements C to I to the VM 2. In response, the VM 1 and the VM 2 shift the element A, the element B, the information related to the element A, and the information related to the element B to the VM 1, and shift the elements C to I and information related to the elements C to I to the VM 2.

Upon receiving a notification of completion of the shifting operation from the VM 1 or the VM 2, the distribution executing unit 18f updates the list of the VM 1 "rule 1/rule 2/rule 3/rule 4" to the "element A, element B", as illustrated in FIG. 17(b). Similarly, the distribution executing unit 18f generates a list of "element C to element I" for the VM 2. The distribution executing unit 18f also updates the "distributee list" for each of the elements illustrated in FIG. 16.

In this manner, according to the third embodiment, when the loads of the CEP processes increase, a combination of the elements can be selected so as to distribute the loads with the smallest isolation overhead based on the correlations between the element and the rate of loads on the CEP processes, and such a combination of the elements can be shifted to the respective VMs.

[d] Fourth Embodiment

Although some embodiments of the present invention are explained above, the present invention may be implemented in various forms other than those described above. Different embodiments of the present invention will now explained below.

Application to Servers

Figure 18:
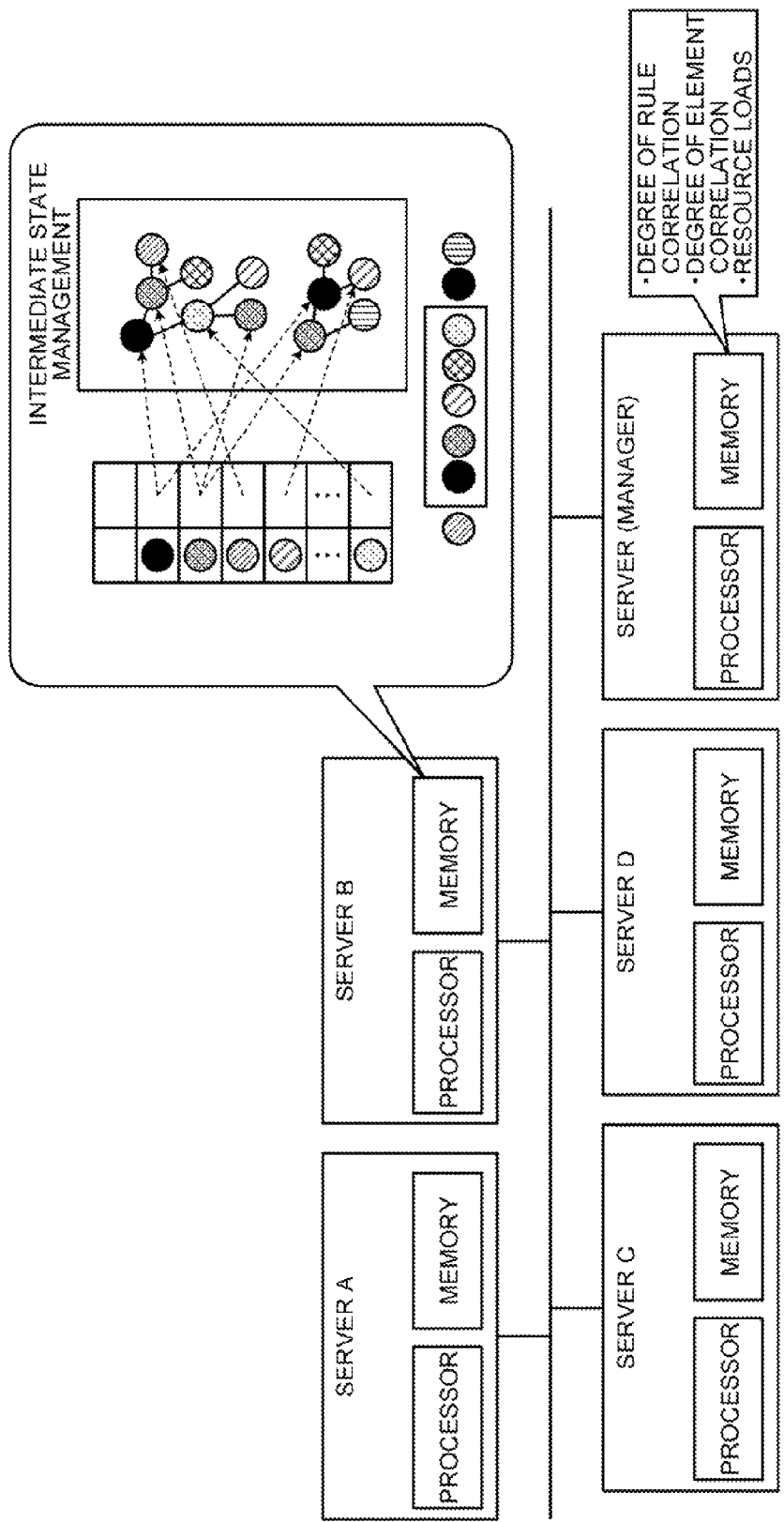
FIG. 18 is a schematic of a configuration of a system in which a CEP engine is implemented on every physical server.

In the first to the third embodiments, the CEP processes are explained to be executed by the VMs on the server. However, the present invention is not limited thereto, and the same process can be achieved in a configuration in which physical servers are used to execute the CEP processes. FIG. 18 is a schematic of a configuration of a system in which a CEP engine is implemented in every physical server. As illustrated in FIG. 18, this system includes a server A, a server B, a server C, and a server D each of which is communicatively connected to a server (manager).

Among these servers, the server A, the server B, the server C, and the server D are servers for executing the CEP processes. In other words, each of the server A, the server B, the server C, and the server D has the function equivalent to the function of each of the VM 1 and the VM 2 illustrated in FIG. 5, and executes the events based on the rules or the elements retained therein. The server (manager) is a server for managing the CEP processes on each of the servers. In other words, the server (manager) includes each of the functions of the processor 18 and each of the databases on the memory 17 illustrated in FIG. 5. The server (manager) executes distribution of the rules or the elements using one of the methods disclosed in the first to the third embodiments when the load of at least one of the server A, the server B, the server C, and the server D reaches a predetermined level or higher.

Method for Determining Distribution Rule

Various methods may be used in addition to the distribution rule that is the method for determining the rules or the elements to be shifted explained above in the first to the third embodiments. In the explanation of the present embodiment, an example of determining the rules to be shifted will be explained. The same process can be executed for the elements. As an example, the second embodiment and the third embodiment may be applied together.

For example, it is possible to assign a weight to each of the "degree of rule correlation", the "resource loads", and the "stream load" to calculate a dispersion, and to shift from one or more rules having a higher dispersion to a single VM. As an example, a weight of three is assigned to the "rule correlation", a weight of two is assigned to the "resource loads", and a weight of one is assigned to the "stream load".

In such a case, the distribution determining unit 18e calculates the "degree of rule correlation" to be the number of correlating rules multiplied by the number of correlating elements and by three. The distribution determining unit 18e also calculates the "resource loads" to be the number of the "CPU utilization rate", the "memory utilization rate", and the "network utilization rate" exceeding the respective thresholds multiplied by two. The distribution determining unit 18e also calculates the "stream load" to be the number of the "stream load" exceeding the threshold multiplied by one. The distribution determining unit 18e then calculates the sum of these calculation results as a dispersion, and determines how to distribute the rules based on the dispersion thus calculated.

As another alternative, it is also possible to allow the administrator to specify which one of the values of the "degree of rule correlation", the "resource loads", the "stream load" is prioritized, and which one of these values is used upon executing the process. In other words, any combinations of the "degree of rule correlation", the "resource loads", and the "stream load", and weights may be specified in his/her discretion.

The distribution determining unit 18e may also distribute the loads of the CEP processes by shifting rules with a low correlation to different VMs based on the calculated utilization of the resources such as the CPU, among the condition expressions utilizing resources at a level equal to or higher than a predetermined level. Similarly, the distribution determining unit 18e may also distribute the loads of the CEP processes by shifting condition expressions having a low correlation between the elements to different VMs based on the calculated utilization of the resources such as the CPU, among the elements utilizing resources at a level equal to or higher than a predetermined level. As the utilization of the resources, the utilization by each rule illustrated in FIG. 8 or the utilization by each element illustrated in FIG. 15 may be used.

It is advantageous, in view of load distribution, to select the rules utilizing the resources to a larger degree in excess of the thresholds and with smaller correlation therebetween (with a small <*(*)>). In the same manner, it is advantageous, in view of load distribution, to select the elements utilizing the resources to the largest degree in excess of the thresholds and with smaller correlation therebetween (with the smallest (<?&?>).

Recovery after Load Decrease

If the processing load recovers to the normal condition after the rules or the element are distributed in the manner described in the second embodiment or the third embodiment, for example, the rules or the element can be brought back to the original condition before the distribution. The condition before the distribution may be stored in the memory and the like. As an example, separate "thresholds" may be specified for this integrating operation and the distributing operation, and the timing for starting the operations may be determined by feeding back the past information. For example, the information about the condition before the rules or the elements are shifted is stored in the memory and the like, and the rules may be shifted back to the condition before being shifted, or the elements may be combined into the rules again when the VM processing load which had increased decreases to a predetermined level. Alternatively, based on the strength of correlation illustrated in FIG. 8, for example, the rules thus distributed may be grouped into rules with strong correlations and rules with weak correlations, and these groups of rules may be executed on different VMs.

System

Among those processes explained in the embodiments, the whole or a part of the processes explained to be executed automatically may also be executed manually. Furthermore, the whole or a part of the processes explained to be performed manually may be performed automatically by known methods. In addition, processing or controlling procedures and specific names, e.g., information including various types of data and parameters indicated in FIGS. 6 to 10 and FIGS. 15 to 17, for example, may be modified in any manner unless specified otherwise.

The elements included in the apparatuses are illustrated in the drawings to schematically depict their functionality, and may not be configured physically in the manner illustrated in the drawings. Specific configurations in which the apparatuses are distributed or integrated are not limited to those illustrated in the drawings, e.g., the distribution determining unit 18e and the distribution executing unit 18f may be integrated. The whole or a part of the apparatuses may be distributed or integrated functionally or physically in any units depending on various loads or utilization. The whole or a part of the processing functions executed in each of the apparatuses may be realized as a CPU and a computer program parsed and executed by the CPU, or realized as hardware using wired logics.

Computer Programs

The various processes explained above in the embodiments may be realized by causing a computer system, such as a personal computer or a workstation, to execute computer programs created in advance. An example of such a computer system executing computer programs having the same functions as those explained in the embodiments will be explained below.

Figure 19:
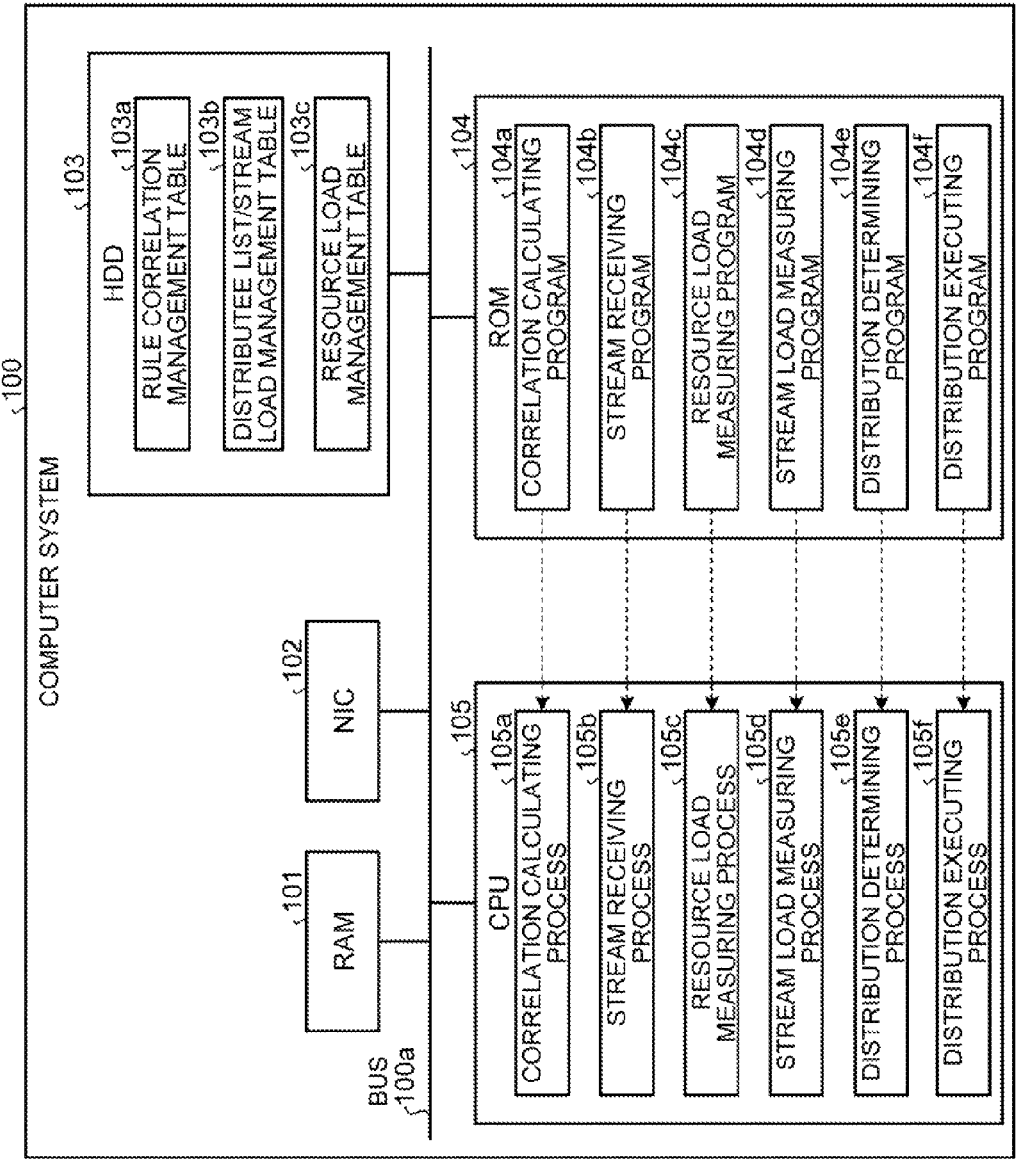
FIG. 19 is a schematic of an example of a computer system executing a complex event distributing program.

FIG. 19 is a schematic of an example of the computer system executing a complex event distributing program. As illustrated in FIG. 19, this computer system 100 includes a CPU 105, a read-only memory (ROM) 104, and a random access memory (RAM) 101, all of which are connected to a bus 100a. In addition, in the computer system 100, a network interface card (NIC) 102, and a hard disk drive (HDD) 103 are connected to the bus 100a.

The HDD 103 has a rule correlation management table 103a corresponding to the rule correlation management record 17a illustrated in FIG. 5. Similarly, the HDD 103 has a distributee list/stream load management table 103b corresponding to the distributee list/stream load management record 17b. Similarly, the HDD 103 has a resource load management table 103c corresponding to the resource load management record 17c.

The ROM 104 retains therein a correlation calculating program 104a, a stream receiving program 104b, a resource load measuring program 104c, a stream load measuring program 104d, a distribution determining program 104e, and a distribution executing program 104f. The ROM 104 is mentioned herein as an example of tangible recording media. However, these computer programs may be stored in other computer-readable recording medium, such as the HDD, the RAM, a compact disk (CD) ROM, and the like, and the computer may be caused to read the computer programs therefrom. It is also possible to deploy a tangible recording medium in a remote location, and to allow the computer to access the tangible recording medium and to obtain the computer programs therefrom. In this process, the computer programs thus obtained may be stored in a tangible recording medium included in the computer itself, so that the computer can use the computer programs therefrom.

The CPU 105 reads and executes the correlation calculating program 104*a* to realize the same operation as that performed by the correlation calculating unit 18*a* as a correlation calculating process 105*a*. The CPU 105 reads and executes the stream receiving program 104*b* to realize the same operation as that performed by the stream receiving unit 18*b* as a stream receiving process 105*b*. The CPU 105 reads and executes the resource load measuring program 104*c* to realize the same operation as that performed by the resource load measuring unit 18*c* as a resource load measuring process 105*c*.

The CPU 105 reads and executes the stream load measuring program 104*d* to realize the same operation as that performed by the stream load measuring unit 18*d* as a stream load measuring process 105*d*. The CPU 105 reads and executes the distribution determining program 104*e* to realize the same operation as that performed by the distribution determining unit 18*e* as a distribution determining process 105*e*. The CPU 105 reads and executes the distribution executing program 104*f* to realize the same operation as that performed by the distribution executing unit 18*f* as a distribution executing process 105*f*. These computer programs retained in the ROM 104 function as a part of the complex event distributing program, and the computer system 100 functions as the complex event distributing apparatus executing the complex event distributing method by reading these computer programs from the ROM 104 and executing these programs.

Deterioration of the processing performance can be prevented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A complex event distributing apparatus comprising:
a processor coupled to a memory,
the processor is programmed to distribute complex events by:
calculating correlations between complex event processing processes executed on information processing apparatuses to detect events from a stream based on condition expressions each identifying an event or based on elements constituting the condition expressions, the calculating includes calculating correlations between the condition expressions or correlations between elements constituting the condition expressions;
obtaining a load status of each of the information processing apparatuses;
detecting an information processing apparatus having a processing load exceeding a predetermined level based on the load status obtained in the obtaining; and
distributing the complex event processing processes to the information processing apparatuses based on the correlations between the complex event processing processes calculated in the calculating when the detecting detects an information processing apparatus having a processing load exceeding the predetermined level,
the distributing distributes the complex event processing processes by shifting the condition expressions or the elements constituting the condition expressions to the information processing apparatuses in a manner to gather the condition expressions having high correlations therebetween calculated in the calculating or the elements having high correlations therebetween calculated in the calculating.

2. The complex event distributing apparatus according to claim 1, wherein
the calculating calculates correlations between the condition expressions based on number of redundancy of the elements constituting the condition expressions as the correlations between the complex event processing processes, and
the distributing distributes the complex event processing processes by shifting the condition expressions to the information processing apparatuses based on the correlations between the condition expressions calculated in the calculating.

3. The complex event distributing apparatus according to claim 1, wherein
the calculating calculates correlations between the elements based on any one of or both of number of combinations of the elements constituting the condition expressions and concatenations of the elements in the condition expressions as the correlations between the complex event processing processes, and
the distributing distributes the complex event processing processes by dividing each of the condition expressions into elements, and shifting the divided elements to the information processing apparatuses based on the correlations between the elements calculated in the calculating.

4. The complex event distributing apparatus according to claim 1, wherein
the calculating further calculates resource utilization for each of the condition expressions, and
the distributing distributes the complex event processing processes by shifting the condition expressions having low correlations therebetween calculated in the calculating to different information processing apparatuses from the condition expressions having the resource utilization calculated in the calculating in excess of a predetermined level.

5. The complex event distributing apparatus according to claim 1, wherein
the calculating further calculates resource utilization for each of the elements, and
the distributing distributes the complex event processing processes by shifting the elements having low correlations therebetween calculated in the calculating to different information processing apparatuses from the elements having the resource utilization calculated in the calculating in excess of a predetermined level.

6. The complex event distributing apparatus according to claim 1, wherein the distributing brings back the complex event processing processes to a condition before being distributed when the processing load of the information processing apparatus detected in the detecting becomes lower than the predetermined level.

7. A complex event distributing method that is a control method executed by a computer, the method comprising:

calculating correlations between complex event processing processes executed on information processing apparatuses to detect events from a stream based on condition expressions each identifying an event or based on elements constituting the condition expressions, the calculating includes calculating correlations between the condition expressions or correlations between elements constituting the condition expressions;

obtaining a load status of each of the information processing apparatuses;

detecting an information processing apparatus having a processing load exceeding a predetermined level based on the load status thus obtained; and distributing the complex event processing processes to the information processing apparatuses based on the correlations between the complex event processing processes thus calculated when an information processing apparatus is detected to have a processing load exceeding the predetermined level, the distributing distributes the complex event processing processes by shifting the condition expressions or the elements constituting the condition expressions to the information processing apparatuses in a manner to gather the condition expressions having high correlations therebetween calculated in the calculating or the elements having high correlations therebetween calculated in the calculating.

8. A non-transitory computer-readable medium storing a program for processing a complex event distributing, the program causing a computer to execute:

calculating correlations between complex event processing processes executed on information processing apparatuses to detect events from a stream based on condition expressions each identifying an event or based on elements constituting the condition expressions, the calculating includes calculating correlations between the condition expressions or correlations between elements constituting the condition expressions;

obtaining a load status of each of the information processing apparatuses;

detecting an information processing apparatus having a processing load exceeding a predetermined level based on the load status thus obtained; and distributing the complex event processing processes to the information processing apparatuses based on the correlations between the complex event processing processes thus calculated when an information processing apparatus is detected to have a processing load exceeding the predetermined level, the distributing distributes the complex event processing processes by shifting the condition expressions or the elements constituting the condition expressions to the information processing apparatuses in a manner to gather the condition expressions having high correlations therebetween calculated in the calculating or the elements having high correlations therebetween calculated in the calculating.

* * * * *

UNITED STATES PATENT AND TRADEMARK OFFICE
CERTIFICATE OF CORRECTION

PATENT NO. : 8,533,731 B2
APPLICATION NO. : 13/193701
DATED : September 10, 2013
INVENTOR(S) : Yoshinori Sakamoto Page 1 of 1

It is certified that error appears in the above-identified patent and that said Letters Patent is hereby corrected as shown below:

Title page, Item (54) and in the Specification, at column 1, lines 1-3, the Title of the invention should read as shown below:

-- APPARATUS AND METHOD FOR DISTRIBUTING COMPLEX EVENTS BASED ON CORRELATIONS THEREBETWEEN --

Signed and Sealed this
Nineteenth Day of November, 2013

Teresa Stanek Rea
*Deputy Director of the United States Patent and Trademark Office*